Jan. 18, 1966  H. KRUPP ET AL  3,229,516
RADIOMETER FORCE MEASURING APPARATUS
Filed April 23, 1962  3 Sheets-Sheet 1

HELMAR KRUPP,
ERICH ROBENS,
GERD SANDSTEDE,
GERHARD WALTER,
INVENTORS

BY Hall & Houghton
ATTORNEY.

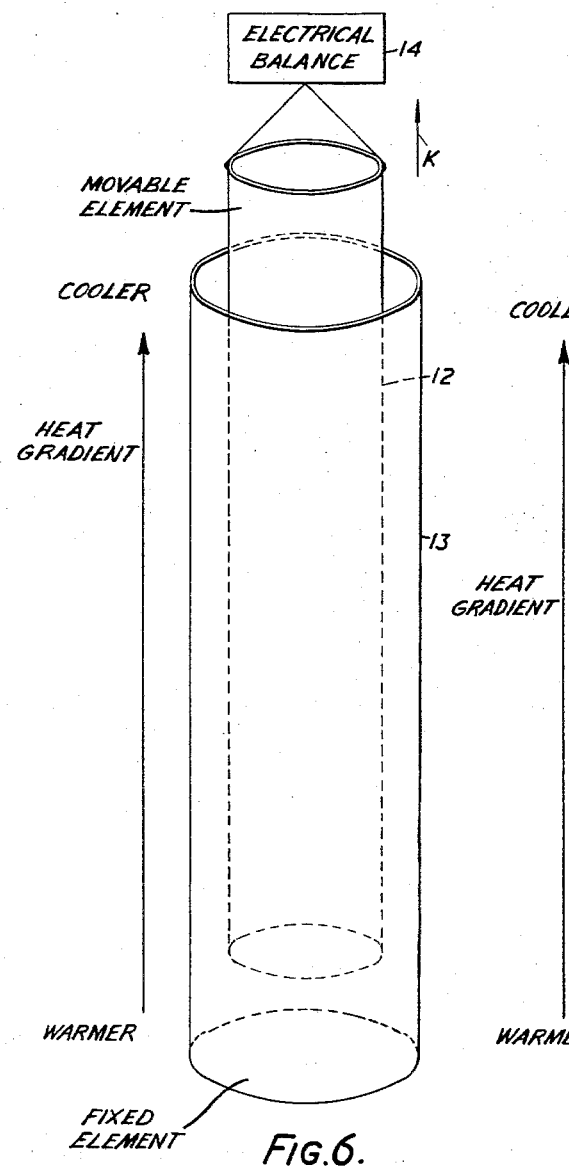
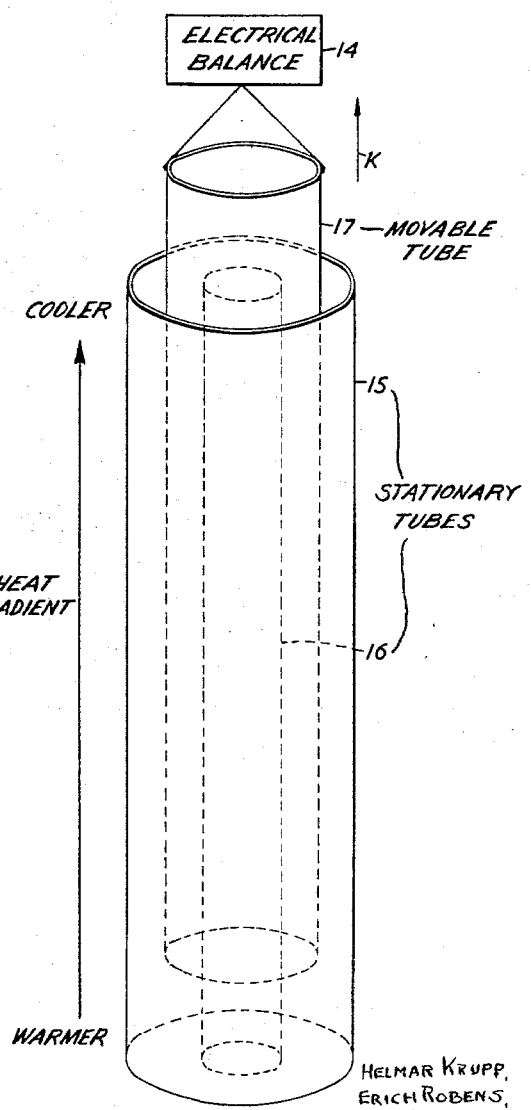

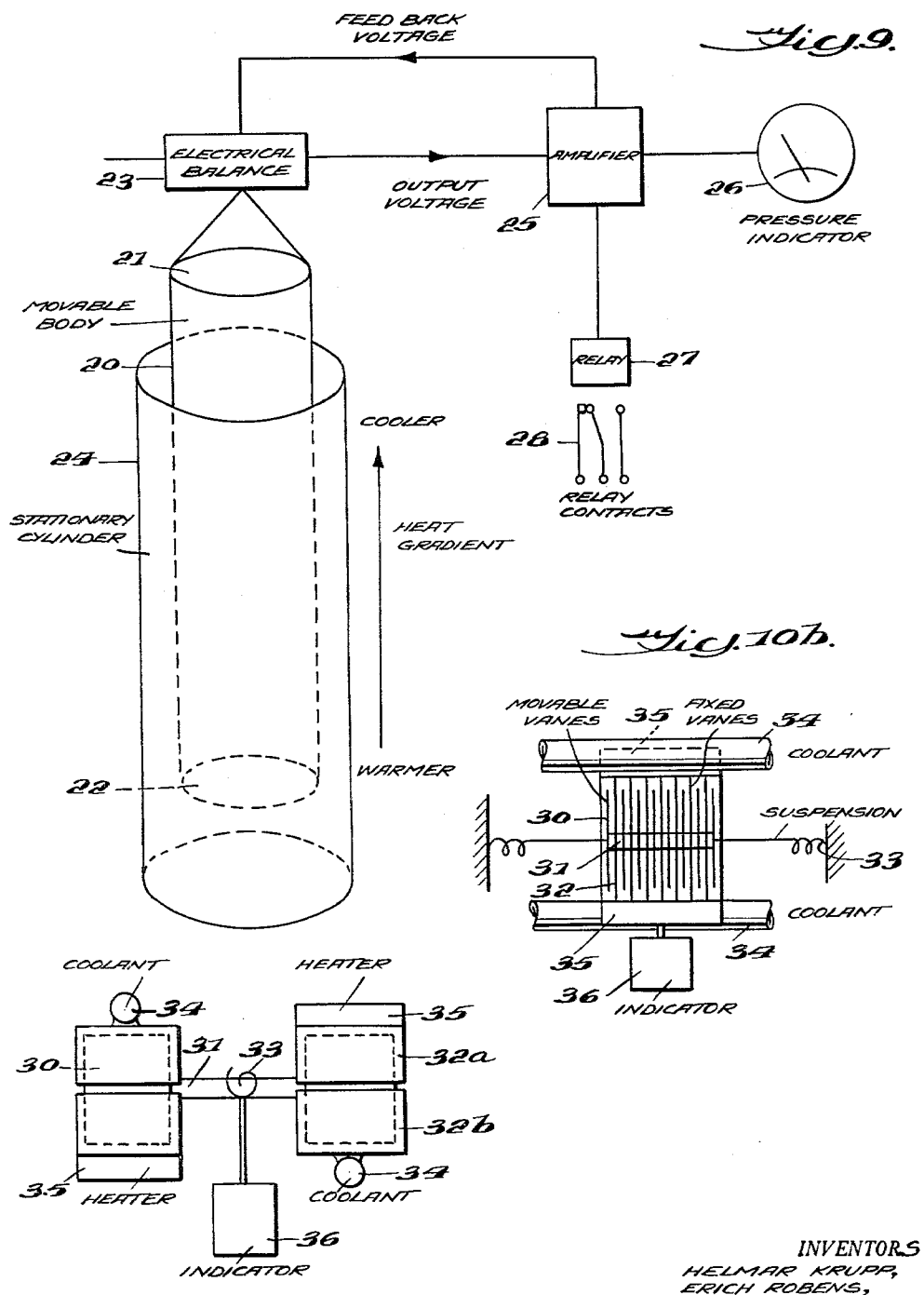

United States Patent Office 3,229,516
Patented Jan. 18, 1966

3,229,516
RADIOMETER FORCE MEASURING APPARATUS
Helmar Krupp, Erich Robens, Gerd Sandstede, and Gerhard Walter, Frankfurt am Main, Germany, assignors to Edwards High Vacuum Limited, Crawley, Sussex, England
Filed Apr. 23, 1962, Ser. No. 189,384
Claims priority, application Germany, May 5, 1961, B 62,395
4 Claims. (Cl. 73—170)

The invention relates to an apparatus for producing thermal gas currents, in particular for measuring a vacuum, and has the aim of making use of the known effects "molecular flow, thermal slip flow and lift" in a new arrangement providing optimum conditions.

The invention will be described with reference to the accompanying drawings, in which:

FIGURE 6 is a perspective view schematically illustrating a radiometer constructed according to the present invention.

FIGURE 8 is a perspective view schematically showing a further embodiment of the present invention.

FIGURE 9 is a schematic view showing a force measuring apparatus similar to that shown in FIGURE 6, along with an indicating system.

FIGURE 10a is a top view of an embodiment of a radiometer constructed according to the present invention.

FIGURE 10b is a partial side view of the embodiment of FIGURE 10a.

Thermal gas currents produce so-called radiometer forces at the surfaces of solid bodies. These are measured on a movable plate. The temperature gradient in the gas, which causes the gas current, may be produced either by heating the plate on one side, for example by radiation, or by heating a fixed wall. A distinction is made between radiometer forces of the first type and of the second type. The former, which are independent of the kind of gas, are due to Knudsen's molecular flow which occurs below about $10^{-2}$ torr and acts at right angles on a plate, while at higher pressures the radiometer force of the second type comes about owing to the tangential thermal slip flow (tangential radiometer effect).

Figure 1:
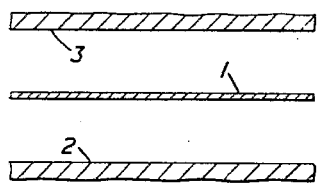
FIGURE 1 is a cross-sectional view showing a portion of a plate radiometer.

According to Knudsen (see R. Jaeckel "Vakuumphysik" (Vacuum Physics) in Handbuch der Physik (Manual of Physics, XII, 1958) in a plate radiometer, as illustrated in FIG. 1 of the accompanying drawings, the radiometer force of the first type acting at right angles is expressed by the following equation:

$$K = F \frac{p}{2\sqrt{T_1}} (\sqrt{T_2} - \sqrt{T_1}) \qquad (1)$$

$T_1$ signifying the temperature of a fixed cold plate 2, $T_2$ the temperature of a fixed hot plate 3, $p$ the pressure of the cold gas and F the area of the movable plate 1. It has been possible to measure the force expressed theoretically by Equation 1 only with small temperature differences—because of the removal of heat by the movable plate—and, for reasons of geometry, with small distances between the plates.

Figure 2:
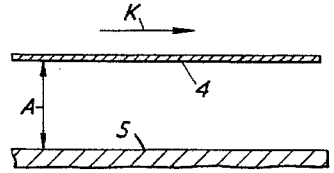
FIGURE 2 is a cross-sectional view showing a portion of a plate radiometer different from that shown in FIGURE 1.

The tangential thermal slip flow and, consequently, the radiometer force of the second type, has been measured with the following arrangements:

(a) M. Czerny and G. Hettner (see Hettner, Ergebn. d. exakt. Naturw. VII, 1928) were responsible for the arrangement illustrated in FIG. 2. In this instance, a movable plate 4 is carried along secondarily by friction. Thus, the radiometer force itself is not measured. For the measuring system according to FIG. 2, the following force is obtained according to Hettner:

$$K = F \frac{1}{A} \frac{3\eta^2}{4\rho T} \frac{dT}{dx}$$

or, converted, so as to be able to recognize the pressure dependence:

$$K = F \frac{1}{A} \eta \lambda (\mathrm{H} - 1) \frac{1}{p} \frac{dT}{dx} \qquad (2)$$

F signifying the area of the movable plate 4, A the distance between the two plates 4 and 5, $\eta$ the viscosity of the gas, $\lambda$ the heat conductivity of the gas, H the adiabatic exponent of the gas, $p$ the pressure and $dT/dx$ the temperature gradient of the gas.

Figure 3:
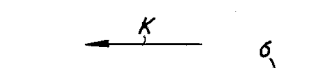
FIGURE 3 is a cross-sectional view showing a movable plate.

(b) In contrast to Hettner, H. Klumb and K. H. Schmitt (Vakuumtechnik 7 (1958) 185) produced the temperature gradient of the gas by means of a temperature gradient on a movable plate 6, FIG. 3, and the radiometer force was measured on this plate. Further to a Hettner formula for photophoresis, Klumb and Schmitt find the force proportional to the plate area F:

$$K = F \text{ const. } \eta \lambda (\mathrm{H} - 1) \frac{1}{p} (T_2 - T_1) \qquad (3)$$

(c) Just as the radiometer force of the first type also occurs in a plate with a temperature gradient parallel thereto in the molecular flow range—although heretofore on a small scale in the known measuring arrangements for reasons of geometry—so is the radiometer force of the second type also operative in plate radiometers with a temperature gradient normal thereto in the thermal slip flow range. In the case of the movable plate in FIG. 1. being a circular disc, Einstein and Epstein (see P. S. Epstein, Z. F. Physik 54 (1929) 537) explain the radiometer force of the second type likewise acting from hot to cold due to the fact that the thermal slip flow acts only at the edge of the disc and consider that:

$$K = 2.5 (2\pi r) \eta \lambda (\mathrm{H} - 1) \frac{1}{p} \frac{dT}{dx} \qquad (4)$$

i.e. the force is proportional to the radius $r$ of the disc.

Figure 4:
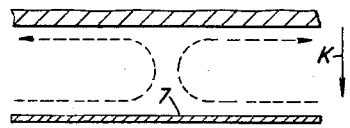
FIGURE 4 is a cross-sectional view illustrating tangential flow in a plate radiometer.

In contrast to Epstein's explanation, Hettner believes (loco citato) that the force results from a tangential flow, illustrated in FIG. 4, since the disc 7 is hotter in the middle than at the edge when, for example, it is heated by radiation. Fanselau (see Hettner, loco citato) has calculated this case of the secondary action (as in paragraph a), of the thermal slip flow, following on Hettner, and established a dependence of the force on plate area and distance.

Figure 5:
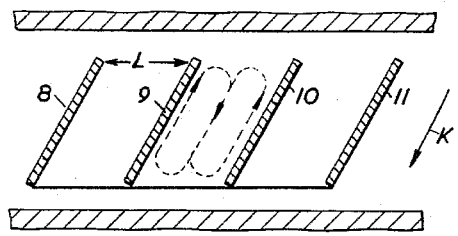
FIGURE 5 is a cross-sectional view illustrating a Klumb radiometer.

(d) What has been said at the beginning of paragraph c also applies to the Klumb radiometer, illustrated in FIG. 5, which comprises a plurality of inclined plates 8–11 connected to one another. The radiometer force of the second oype has been calculated by Weber and measured by H. Klumb and D. Fuchs (Vakuumtechnik, 7 (1958) 125) and was found to be:

$$K = F \frac{1}{L} \cdot \text{factor} \cdot \eta \lambda (\mathrm{H} - 1) \frac{1}{p} \frac{dT}{dx} \qquad (5)$$

in which L is the distance between the connected movable plates.

As stated in the papers mentioned, the arrangements described exhibit the following drawbacks: In these arrangements, the heat conductivity of the material has a disturbing effect, whether because the transmitted impulse is reduced owing to heat exchange with the gas, or because the temperature difference adjusted at the system cannot be absorbed completely by the gas, from which in all cases a substantially smaller radiometer force results. Furthermore, in the known arrangements and according to the known equations, the radiometer forces can be increased only by increasing the plate areas. For reasons of weight and space, however, there is a technical limit to this possibility.

From the state of the art which has been described it will therefore be apparent that it is, in fact, known to measure radiometer forces with one-plate and two-plate arrangements, but that it has not been possible to utilize large temperature differences fully and so to design the geometry of the arrangement that maximum flows or currents and forces occur and can be measured.

The object of the present invention is to obviate these drawbacks.

According to the present invention apparatus includes relatively movable opposed elongated surfaces along at least one of which a temperature gradient is maintained, the distance between the surfaces being small in relation to their lengths and in which molecular and radiometer forces produce gas currents which transmit a force to at least one of said surfaces said force being a function of the pressure of the gas, the magnitude of the temperature gradient, the nature of the gas and the dimensions and relative spacing of the surfaces.

One of said surfaces may be constituted by the interior wall of a hollow cylinder and another surface may be constituted by a body disposed within the cylinder.

Alternatively the surfaces may be arranged as a plurality of pairs opposite each other, one surface of each pair being fixed and the other movable, and the movable surfaces may be collectively operative upon means for utilizing the said force.

In a method of determining the pressure of a gas the apparatus includes a force measuring device and the said force is measured when the temperature gradient, the relative dimensions and spacings of the surfaces and the nature of the gas are known and fixed. Advantageously the said force is measured by an electrically operated balance.

In a method of controlling a process in response to a change in pressure, motion of one of the surfaces, produced by the said force, operates control means. The control means may be constituted by an electric switch. Alternatively the control means may be constituted by a control valve.

An example of embodiment of the invention will be described hereinafter with reference to FIGURE 6 of the accompanying drawings.

Figure 7:
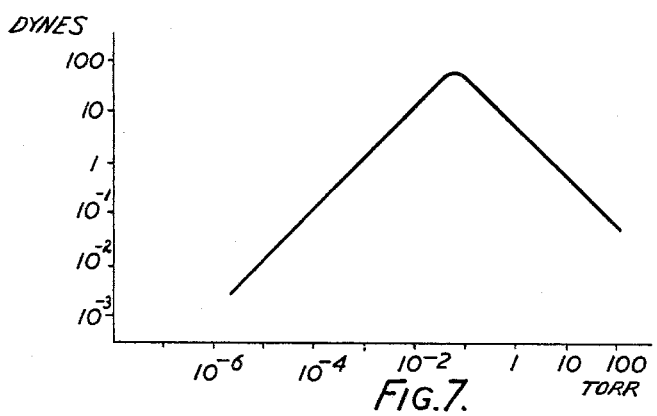
FIGURE 7 is a plot of the force measured in a radiometer as a function of the pressure.

Referring to FIG. 6 of the drawings, an open hollow cylinder 12 of aluminium (200 mm. long, 16 mm. in diameter) is disposed within a glass jacket or sleeve 13 having a diameter of 27 mm., the lower part of which is heated to 500° C., the cylinder being suspended from an electric vacuum balance 14 serving as a force measuring device. The upper part of the jacket 13 may be at room temperature and it may also be cooled. The force measured, when using nitrogen, is represented in the graph of FIGURE 7 as a function of the pressure. Accordingly, with this simple arrangement, a maximum force of 60 dynes is measured which can also readily be multiplied by dimensioning the arrangement differently. In fact, it has been found experimentally that the thermal slip flow force is proportional to the periphery U of the cylinder 12 and in inverse proportion to the distance A of the surface of the cylinder from the inner surface of the housing. The following equation has been found for the principle of the arrangement illustrated by FIGURE 6:

$$\frac{dK}{dx} = 4.0 \frac{U}{A} \frac{1}{p} \eta \lambda (H-1) \frac{dT}{dx} \tag{6}$$

or integrated:

$$K = 4.0 \frac{U}{A} \frac{1}{p} \int_{T_2}^{T_1} \eta \lambda (H-1) dT \tag{7}$$

By further development of the equation, the temperature dependence of the radiometer force of second type can be obtained and the dependence on the type of gas can be better recognized.

$$K = \frac{4.0}{\sqrt{T^3_o}} \frac{U}{A_o} \eta_o (H_o - 1) \sqrt{\frac{T^{-3}}{p}} (T_2 - T_1) \cdot f(T, G) \tag{8}$$

with $$f(T, G) = \frac{\sqrt{T_o^3}}{\sqrt{T^3}(T_2 - T_1)} \cdot \int_{T_1}^{T_2} \frac{\eta}{\eta_o} \cdot \frac{\lambda}{\lambda_o} \cdot \frac{H-1}{H_o - 1} dT \approx 1 \tag{9}$$

$\eta_o$, signifying viscosity of the gas at 0° C., $\lambda_o$ heat conductivity of the gas at 0° C.; $H_o$, adiabatic exponent of the gas at 0° C.; $T_o = 273°$ K.; $T = (T_2 + T_1)/2 \cdot f(T,G)$ is a factor which depends on the temperature T and the type of gas G. However, the deviation from 1 in the case of nitrogen, oxygen, hydrogen, argon and helium at temperatures between −200° C. and +600° C. is not greater than 5%. Only carbon dioxide and water give a factor of 1.2 at 500° C. Moreover, the correcting factor can be accurately calculated from Equation 9. The dependence of the force on the type of gas can be seen from the factor $\eta_o \cdot \lambda_o (X_o - 1)$. In dyne² (cm.⁻¹ degree⁻¹) this factor is, for $N_2$—0.161      $CO_2$—0.058
$O_2$—0.189      He—1.68
$H_2$—0.580      $H_2O$—0.047
Ar—0.228

If the pressure p is indicated in dynes/sq. cm.—by multiplying its value in torr by 1333—the force is obtained in dynes≈mg. The dependence on the type of gas has been measured and correspondence with Equation 8 found.

According to Equation 8, the thermal slip flow force shows a strong temperature dependence. In fact, it is proportional to $T^{-1.5}$. This dependence has been measured in the range of −200° C. to +500° C. In the same temperature range, the force according to Equation 8 is also determined by the full temperature difference. Moreover, there are no experimental indications that this no longer applies at higher temperatures. In conventional plate radiometers, the temperature difference produced at the plate already no longer takes full effect when it exceeds 10° C.

In the arrangement according to the invention, the force is proportional to the ratio of the periphery of the body to the distance from the housing (see Equation 8). On the other hand however the force in Hettner's arrangement is proportional to the area and inversely proportional to the distance between the plates and, moreover, of opposite direction (see Equation 2). In the Knudsen-Einstein-Epstein arrangement (Equation 4), the force is proportional to the radius of the disc and in the arrangement of Klumb and Schmidt (Equation 3) and in that of Klumb and Fuchs (Equation 5) it is proportional to the area.

By virtue of the connection found between the force and the geometry of the arrangement, large and easily measurable forces can be obtained with the simple apparatus according to the invention. In said example, a force of 5.8 dynes has been measured at 1 torr. In conformity with Equation 8, seventeen times the value was obtained when the diameter of the tube was increased to 10 cm. and the distance reduced to 0.2 cm. The maximum force is about 0.01 Newton. The experiments were carried out with wide bands, wires, tubes and parallelepipeds down to a circumference of 100µ; only a small deviation from the constant in Equation 8 was found. It can be concluded therefrom that, by producing the temperature gradient in an elongated housing, edge effects and heat conduction effects can no longer reduce the force. The heat conductivity of the material and the transfer of heat to the gas do not have any measurable influence, as has been proved by using glass and metal. This is achieved in that the ends of the elongated bodies are at the temperature of the surrounding gas and of the opposite wall parts, whereby the temperature gradient in the gas extends directly up to the inner body and the thermal slip flow develops not only at the housing, but also at the inner (movable) body and there causes the measurable force. The radiometer bodies may be open or closed, since the flow forces cancel one another out in the interior when the bodies are hollow. However, the bodies should have a length which is a multiple of their diameter or width. Thus for example, in a tube having a diameter of 1 cm., the force becomes smaller than would correspond to Equation 8 when the length of the tube is less than 4 cm.

Accordingly, what is essential for the invention is that elongated surfaces should be located opposite one another, at a relatively close spacing and in this way the flows or currents described can develop. It is therefore not absolutely necessary that an inner elongated body, for example a plate-shaped structure, be completely surrounded by a counter-surface but it is sufficient for suitable counter-surfaces to be located opposite the major portion of the surface of the inner body.

As has been shown by reference to the arrangement according to FIGURE 6, the thermal slip flow is brought about by the co-operation of two surfaces, the force being inversely proportional to the distance between surface and counter-surface. Moreover, the force is proportional to the periphery of the moveable body and, accordingly, in the case of a plate completely surrounded by a housing, proportional to twice the width of the plate. Owing to this, there is also a simple possibility of multiplying the flow effect, in that, for example, a plurality of tubes are placed one within the other or, for example, rectangular plates are placed side by side. For better temperature equalization, the surfaces should be connected to one another at the top and bottom, the plates being also connected to one another at the sides. If it is desired not only to produce the flow, but also to measure the force, one surface must be fixed and the other free alternately, as illustrated in FIGURE 8 in the case of two stationary tubes or sleeves 15, 16 and a moveable tube 17. FIGURES 10a and 10b illustrate the arrangement of the apparatus when rectangular plates are employed. A series of spaced parallel movable plates 30 are joined together through a spindle 31 and interleaved by a series of spaced parallel fixed plates 32. Each of the plates 32 is formed in two separated sections 32a and 32b, one of which, in operation, is heated and the other cooled. The gap between the separated sections 32a and 32b is found to assist in maintaining a temperature gradient along the plates 32. The spindle is mounted at either end for rotation about its axis and biased by coil hair springs 33. In operation the forces described above act on the movable plates 30 to produce a torque on the spindle 31 the deflection of which is utilized via indicator 36 to display a measurement of, or control the factors giving rise to, those forces.

In order to maintain a temperature gradient across the plates 32, conduits 34, through which coolant may flow, may be provided adjacent one end of the plates, the other ends being heated by heaters 35. Conduits 34 may be joined to form a single continuous flow path, to assure that both sections of plates are cooled to the same degree.

In an arrangement according to FIGURE 6, it is not absolutely essential to arrange the outer jacket or tube so that it is fixed. The fact that a practicable arrangement is also obtained when the outer jacket or tube is moveable will be realized if the outer jacket 15 is assumed to be absent in the case of the arrangement according to FIGURE 8.

The supply and removal of heat for maintaining the temperature gradient is preferably effected at or by an outer, preferably fixed, jacket or tube. The temperature distribution along this tube and that along the other tube, which will generally differ from the first-mentioned distribution, has no influence on the measurement; the only decisive factor is the temperature difference at the ends of the tubes.

In order to be able to maintain a high temperature difference, it may be appropriate to compose the tubes of different materials, for example, of terminal portions having good heat conduction or heat radiation properties and a middle portion having poor heat conduction properties. In the cases of FIGURES 6 and 8, the heating can be effected either in the lower or in the upper part of the tubes. In the first place, the force is directed upwardly and in the second case downwardly.

The arrangement according to the invention is not only most favorable for the production and measurement of radiometer force of type two, but is also substantially superior as regards the measurement of the force of the molecular flow force in the conventional plate arrangement. In the measuring arrangement described, there is no proportionality of the force to the surface at right angles to the temperature gradient, but in a certain sense to the surface parallel thereto.

The following equation applies:

$$K = \frac{L}{2\sqrt{T_1}} Up(\sqrt{T_2} - \sqrt{T_1}) \qquad (10)$$

in which $L = \text{const.} = 0.68$ cm.

Thus, here the force is proportional to the periphery of the elongated body. Consequently, a tangential effect also occurs in this case, with respect to which the effect of the cross-sectional area recedes into the background. In the described example of embodiment of FIGURE 6, a force of 13.7 dynes at $10^{-2}$ torr has been measured. The experiments at the temperatures and with the bodies which have been mentioned in connection with the thermal slip flow also accord in the case of the molecular flow with the established connection, in this case Equation 10, so that by suitably dimensioning the arrangement the desired effect can be obtained. At the same time, however, it must be considered that the maximum radiometer force shifts towards higher pressures if the two forces (of first and second type) become greater. This has been established experimentally and is connected with the fact that the force increases with increase in temperature and a reduction of the spacing—Equation 8—and the mean free path of the gas molecules then falls below the length of the spacing only at higher pressures.

What has been said in connection with the thermal slip flow in respect of the shapes of the bodies also applies to the measurement of the molecular flow. Moreover, full utilization of the temperature difference and the independence of heat conduction and heat transfer were also found in this case, since opposite surfaces are at about the same temperature. The force caused by the molecular flow was found theoretically to be independent of the type of gas.

If the diameter of the radiometer tube is made larger than 3 cm., Equation 10 is only approximately true. A zone of transition begins here and, at considerably larger diameters, the cross-sectional area of the body has a stronger effect than its periphery. With larger diameters, it is important that the radiometer bodies be closed at both ends if they are not to be extended. It is also possible to arrange at the position of the maximum temperature gradient within the tubular open radiometer body a plate extending over the cross-section. With these arrangements there is always obtained even more than the theoretical force according to Equation 1, which has not yet even been reached heretofore with large temperature differences. The radiometer force of second type is obtained—unaffected thereby—in accordance with Equation 8. The molecular flow force may also become greater than corresponds to Equation 10, namely when the distance of the housing from the body is made larger than its diameter. In this case, the constant L increases with increasing distance.

The measurement of the forces can be effected with known force measuring devices, for example a torsion wire or a spring. It is also possible to employ a balance. Apparently, balances have not been used so far for measuring radiometer forces. There may be used for this purpose, for example, a spring balance, a torsion balance or a beam balance. It is a particular advantage in the arrangement according to the invention that flow and force are not affected when the radiometer body is shifted in the direction of the temperature gradient. Thus, the change in length, for example, of a spring does not cause any interference. To measure the radiometer force with a balance, the weight of the radiometer body is tared or the deflection caused by the weight of the body is taken as the zero point. The change of weight caused by the radiometer force is then measured. If an electric balance is used, the force, and thus, the gas pressure can be registered in simple manner.

Even at pressures above 20 torr, pressure-dependent flow forces which are stronger than those to be expected according to Equation 8 can still be measured with the arrangement according to the invention.

Another possibility of measurement in the upper pressure range, which has been applied successfully, is measuring the lift. Apparatus of this type is illustrated in FIGURE 9. An hermetically sealed cylindrical body 20, having a top closure 21 and a bottom closure 22 is suspended from a balance 23. Surrounding the body 20 is an open ended cylinder 24 to which is applied an axial temperature gradient. Depending on the kind of gas, its pressure and its temperature the body 20 will experience a lift due to the weight of gas which it displaces. This lift can be measured on the balance 23. Thus pressure measurements are possible even below 1 torr with a sensitive balance. For example if the body 20 has a volume of 100 cc. and is suspended in air at room temperature it will experience a lift of approximately 1 $\mu$g. when the pressure is $10^{-2}$ torr. At the same time the apparatus of FIGURE 9 functions in a manner similar to that of the apparatus of FIGURE 6 and at lower pressures the molecular flow force and the thermal slip flow force already described with reference to FIGURE 6 will operate to provide measurements of those lower pressure. The idea of using the lift for pressure measurement has practically speaking not been carried into effect heretofore, evidently because this method of measurement appeared to be too costly. In connection with the radiometer, however, measurement of the lift affords a simple extension of the measuring range in the direction of high pressures. Hence, by means of the invention there is created an apparatus for measuring a vacuum by means of which a pressure range from $10^3$ torr (atmospheric pressure) to $10^{-8}$ torr is embraced in a single measuring arrangement. (Extension of the measuring range in both directions is possible by suitably dimensioning the measuring body and the force measuring device, that is at greater cost.) The following forces are utilized:

(1) the molecular flow force at pressures below $10^{-2}$ torr
(2) the thermal slip flow force at pressures from about $10^{-2}$ torr upwards
(3) the lifting force at pressures from about 1 torr upwards.

The apparatus of FIGURE 9 may also be used as a control device. The balance 23 is an electric balance and output voltage signals derived from it are fed to an amplifier 25. A portion of the amplified signal is fed back to the balance in a conventional manner. Another portion of the amplified signal is fed to a pressure indicating gauge 26, and a still further portion of the amplified signal is fed to a relay 27. The relay 27 is adapted to operate so that when a predetermined level of input thereto is reached relay contacts 28 alter their state. For example the apparatus could be used in low pressure vapor deposition plant to automatically control a deposition cycle via the relay contacts 28 in accordance with pressure variations in the plant. Furthermore, the radiometer body can be so designed that it controls a stream of gas in dependence upon the pressure as a result of its change of position.

After the pressure measurements, some further examples of application of the invention will now also be mentioned. The radiometer forces, of course, have their origin in gas currents. As the arrangements described supply maximum radiometer forces, they are also suitable for producing said gas currents in optimum manner, for which purpose the tubes or plates can then all be arranged fixedly. Since pressure differences are caused by the currents, it is possible, for example, to utilize the pump action of the arrangement. Furthermore, the flow and, thus, the pressure difference are dependent on the kind of gas. Thus, with the aid of the thermal flow or current, a separation of types of gas can be effected with the arrangement according to the invention and also the separation of isotopes. By multiplying the arrangements, greater effects can readily be obtained.

The pressure dependence of the radiometer force enables the arrangement to be used as a sensitive temperature gauge at low and high temperatures, the room temperature, for example, serving to produce the temperature difference. To this end, the arrangement must be filled with a suitable gas, for example, helium, under a pressure to be selected according to the effect. If a spring is employed as a force measuring device, the complete apparatus need not be larger than a conventional thermometer. The dependence of the radiometer force of type two on the kind of gas can also be utilized in the arrangement, in which the state of equilibrium is reached extraordinarily quickly, inter alia, for the following measurements: determination of kind of gas, searching for leaks in vacuum apparatus, determination of concentration in gas chromotography.

We claim:

1. Measuring apparatus comprising, in combination:
  relatively movable opposed elongated surfaces with one of said surfaces surrounding the other, the distance between said surfaces being small in relation to their length in the direction of elongation;
  means for maintaining a temperature gradient along said length on at least one of said surfaces so that gas currents are developed which produce radiometer and molecular flow forces at the movable surface, the net force on said movable surface being a function of the pressure of the gas, the magnitude of the temperature gradient, the nature of the gas and the dimensions and relative spacing of the surfaces; and
  means coupled to the movable surface for providing an indication of said net force.

2. Measuring apparatus, comprising, in combination:
  relatively movable opposed surfaces arranged as a plurality of pairs adjacent each other, one surface of each pair being fixed and the other movable, the distance between said surfaces being small in relation to the dimensions defining the areas of the surfaces;
  means for maintaining a temperature gradient along at least one of the surfaces of each pair so that gas currents are developed which produce radiometer and molecular flow forces at the movable surfaces, the net force on said movable surfaces being a function of the pressure of a gas in which the surfaces are disposed, the magnitude of the temperature gradient, the nature of the gas, and the dimensions and relative spacing of the surfaces; and means coupled to the movable surfaces for providing an indication of said net force.

3. Measuring apparatus comprising, in combination:

relatively movable opposed surfaces, the distance between said surfaces being small in relation to the dimensions defining the areas of the surfaces, one of said relatively movable surfaces being constituted by the interior wall of a cylinder and the other surface constituted by a body disposed within the cylinder;

means for maintaining a temperature gradient along at least one of said surfaces so that gas currents are developed which produce radiometer and molecular flow forces at the movable surface, the net force on said movable surface being a function of the pressure of a gas in which the surfaces are disposed, the magnitude of the temperature gradient, the nature of the gas and the dimensions and relative spacing of the surfaces; and means coupled to said movable surface for providing an indication of said net force.

4. Apparatus as defined in claim 3 wherein the body disposed within the cylinder is a hermetically sealed body.

References Cited by the Examiner
UNITED STATES PATENTS

| | | | |
|---|---|---|---|
| 1,911,426 | 5/1933 | Brodie | 73—170 |
| 1,911,456 | 5/1933 | Lyon | 73—170 X |
| 2,268,469 | 12/1941 | Barnhart | 73—170 X |

RICHARD C. QUEISSER, *Primary Examiner.*

J. FISCHER, *Assistant Examiner.*